US006053362A

United States Patent [19]

Lin

[11] Patent Number: 6,053,362

[45] Date of Patent: Apr. 25, 2000

[54] CAN-BREAKER

[76] Inventor: Hsi Chung Lin, 3F, No. 27, Lane 191, Hsin-Hsiang Street, Wu-Jih Hsiang, Taichung Hsien, Taiwan

[21] Appl. No.: 09/210,882

[22] Filed: Dec. 15, 1998

[51] Int. Cl.$^{7}$ ........................................................ A23L 2/00

[52] U.S. Cl. ................................ 222/80; 141/329; 83/30; 83/946; 222/83; 137/318

[58] Field of Search .................................... 222/80, 81, 5, 222/83; 83/30, 946; 141/329; 30/124; 137/318

[56] References Cited

U.S. PATENT DOCUMENTS

| | | | |
|---|---|---|---|
| 3,395,724 | 8/1968 | Hamel | 137/318 |
| 5,163,585 | 11/1992 | Campbell | 141/329 X |
| 5,265,762 | 11/1993 | Campbell et al. | 141/329 X |
| 5,291,914 | 3/1994 | Bares et al. | 137/318 X |
| 5,301,532 | 4/1994 | Bickmore et al. | 137/318 X |
| 5,373,866 | 12/1994 | Whalen, II | 137/318 |
| 5,398,718 | 3/1995 | Roinick, Sr. | 137/318 |
| 5,657,676 | 8/1997 | Koller | 83/30 |
| 5,823,236 | 10/1998 | Kirby et al. | 141/329 X |
| 5,896,886 | 4/1999 | Wendt | 137/318 |

*Primary Examiner*—Joseph A. Kaufman
*Assistant Examiner*—Thach Bui
*Attorney, Agent, or Firm*—Rosenberg, Klein & Lee

[57] ABSTRACT

A can-breaker including a first and a second clamping members pivotally connected with each other by a pivot member. The second clamping member is disposed with a thrusting section having a first fixing seat and a thrusting sting. An outer cover is fitted on outer side of the thrusting section. The outer cover is pivotally connected with the second clamping member. One end of the outer cover is disposed with a second fixing seat. A resilient member is connected between the first and second fixing seats. The thrusting sting is prevented from be bent or deformed. So, it can prolong the using life of the can-breaker.

3 Claims, 4 Drawing Sheets

CAN-BREAKER

BACKGROUND OF THE INVENTION

The present invention relates to a can-breaker, and more particularly to a can-breaker for clamping and breaking a high pressure gas can.

FIG. 5 shows a conventional can-breaking pincers composed of two clamping members 80. Each clamping member 80 is integrally formed by a clamping section 81, a pivot section 82 and a grip 83. The two pivot sections 82 of the clamping members 80 are pivotally connected by a pivot shaft 84. A middle portion of one of the clamping sections 81 is disposed with a thrusting needle 85.

In use, a waste high pressure gas can is placed between the two clamping sections 81 and the grips 83 are held tightly to make the thrusting needle 85 thrust into the gas can so as to release the remaining gas in the gas can.

The conventional can-breaking pincers has some shortcomings as follows:

First, when the clamping sections 81 tightly clamp the gas can, the thrusting needle 85 needs to press and thrust the gas can at the same time. Therefore, after a period of use, the thrusting needle 85 tends to deform and lose the can-breaking function.

Second, when thrusting the gas can, the gas remaining in the gas can will escape at the thrusting needle 85 to threaten health of human body and contaminate environment. In addition, the exposed thrusting needle 85 may injure a user.

SUMMARY OF THE INVENTION

It is therefore a primary object of the present invention to provide a can-breaker in which an outer cover is first tightly pressed against the can and then a thrusting sting is thrusted into the can. The thrusting sting is prevented from be bent or deformed so as to prolong the using life of the can-breaker.

It is a further object of the present invention to provide the can-breaker in which a soft pad is fitted around the thrusting sting which is communicated with a gas exhaustion pipe. The gas remaining in the can is exhausted through the gas exhaustion pipe into a processor so that the gas is prevented from escaping around and the contamination is avoided.

It is still a further object of the present invention to provide the can-breaker in which a resilient member is used to retract the thrusting sting in the outer cover, whereby after the can is broken, the thrusting sting is automatically extracted out of the can and retracted into the outer cover so as to avoid impalement.

It is still a further object of the present invention to provide the can-breaker in which the grips are disposed with a latch ring and a notch which serve to collect the grips and reduce the volume of the can-breaker for easy storage.

The present invention can be best understood through the following description and accompanying drawings, wherein:

DETAILED DESCRIPTION OF THE PREFERRED EMBODIMENT

Figure 1:
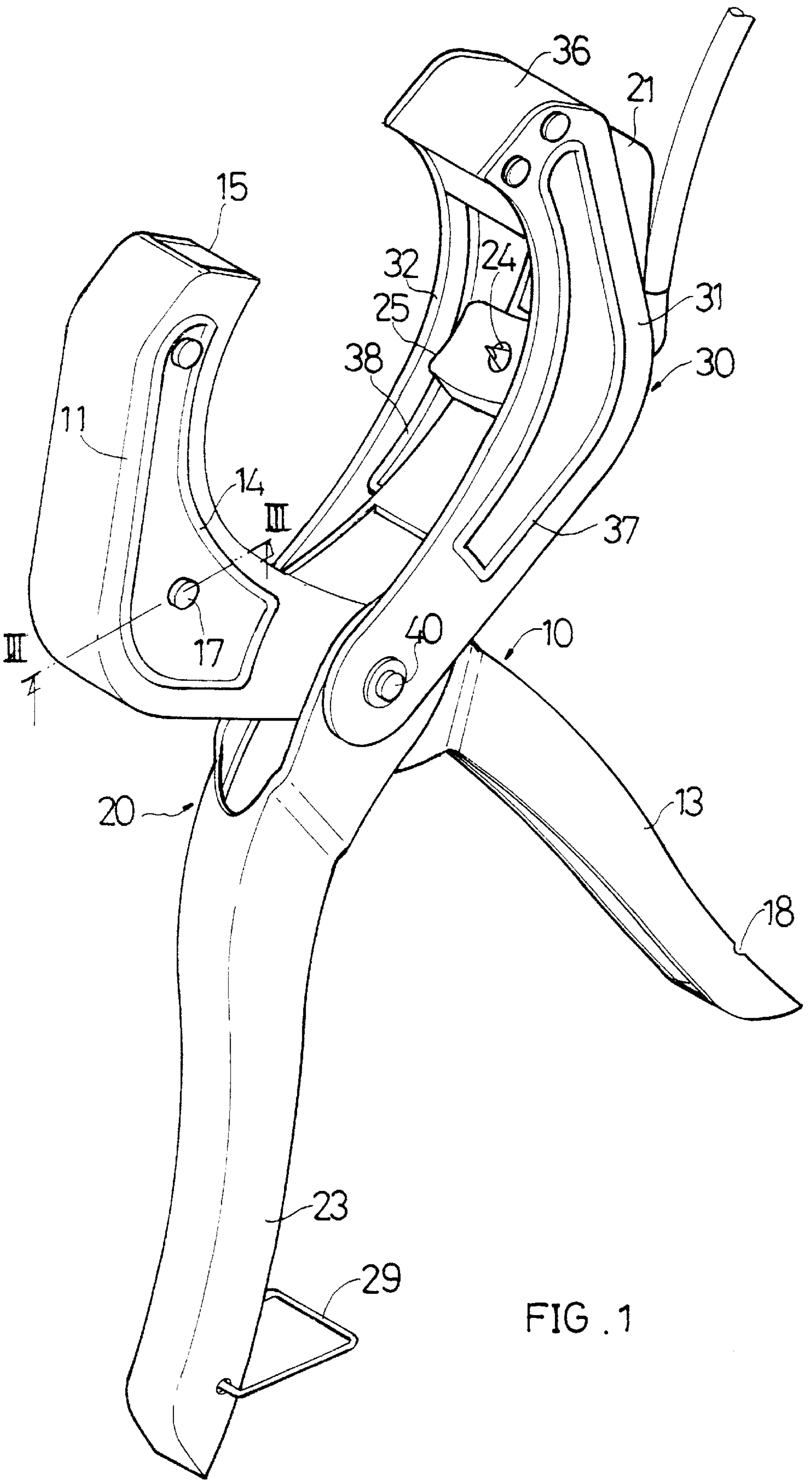
FIG. 1 is a perspective assembled view of the present invention.
Figures 2, 3:
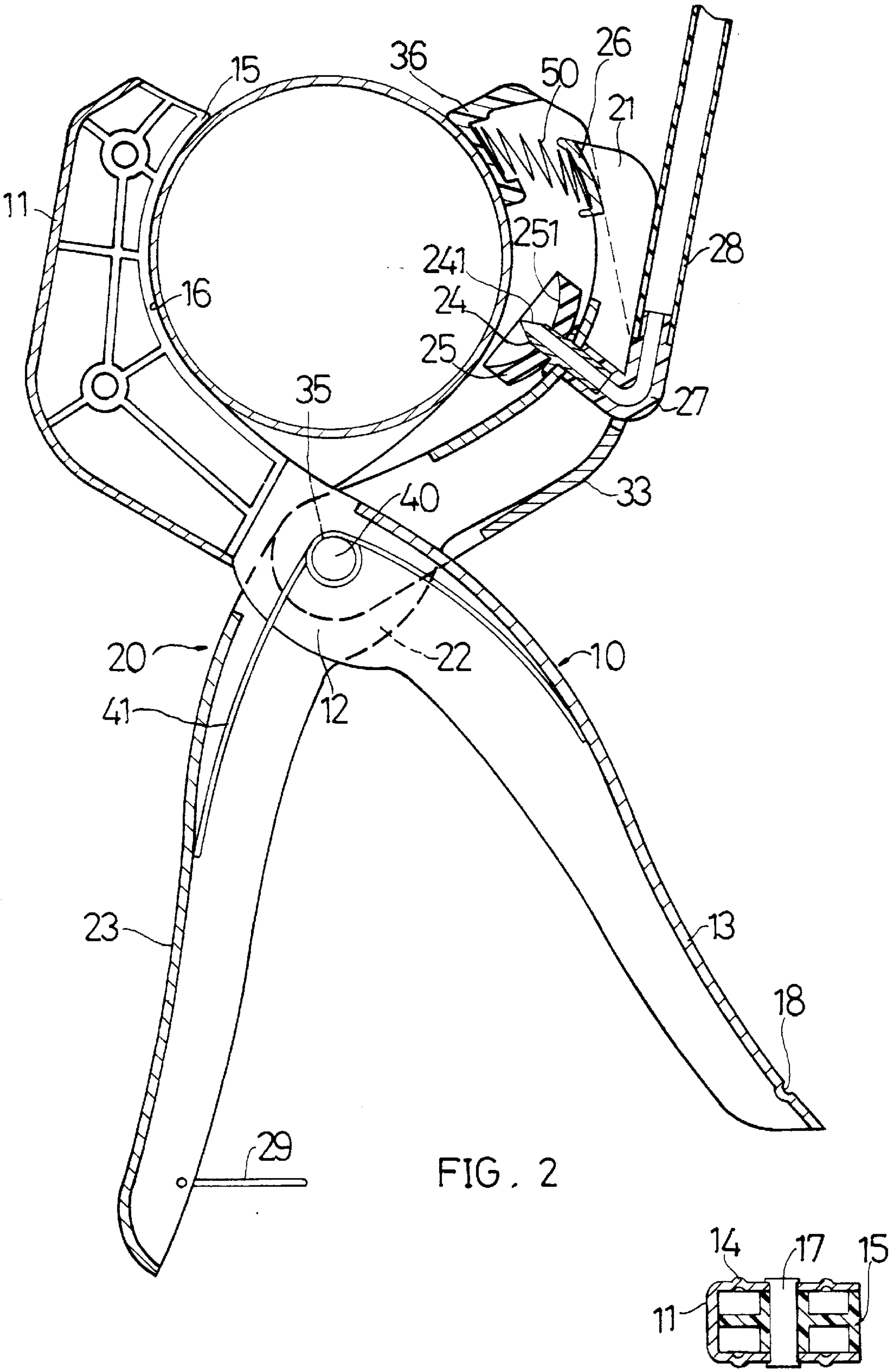
FIG. 2 is a sectional view according to FIG. 1.
FIG. 3 is a sectional view taken along line III—III of FIG. 1.

Please refer to FIGS. 1 and 2. The present invention includes a first clamping member 10 and a second clamping member 20. The first clamping member 10 is integrally formed by a clamping arm 11, a first pivot section 12 and a first grip 13. The clamping arm 11 has a first projecting rib 14 for reinforcing the clamping arm 11. A reinforcing block 15 is secured to inner side of the clamping arm 11 by a rivet 17 (referring to FIG. 3). The reinforcing block 15 has a profile identical to that of the clamping arm 11 and is formed with a concave 16. The end of the first grip 13 is formed with a notch 18.

The second clamping member 20 is integrally formed by a thrusting section 21, a second pivot section 22 and a second grip 23. A middle portion of the thrusting section 21 is disposed with a hollow thrusting sting 24 formed with a slope opening 241. A soft pad 25 is fitted around the thrusting sting 24. The height of the soft pad 25 is slightly higher than the height of the projecting section of the thrusting sting 24. The soft pad 25 is formed with a depression 251 having a height slightly lower than that of the bottom end of the slope opening 241. The thrusting sting 24 is communicated with a gas exhaustion bent tube 27. One end of the bent tube 27 distal from the thrusting sting 24 is connected with a gas exhaustion pipe 28 connected to a processor (not shown). One end of the thrusting section 21 distal from the second grip 23 is disposed with a first fixing seat 26. The end of the second grip 23 is disposed with a latch ring 29 corresponding to the notch 18 of the first grip 13.

The present invention further includes an outer cover 30 composed of two cover boards 31, 32 and an interconnecting section 33. One end of each cover board 31, 32 near the connecting section 33 is formed with a pivot hole 34, 35. The other end of each cover board 31, 32 distal from the pivot hole 34, 35 is fixedly disposed with a second fixing seat 36. Each cover board 31, 32 is formed with a second projecting rib 37, 38 for reinforcing the cover board. The outer cover 30 is fitted onto the outer side of the thrusting section 21 of the second clamping member 20 and pivotally connected with the second clamping member 20 via the pivot holes 34, 35. In this embodiment, the via the pivot holes 34, 35, the outer cover 30 is pivotally connected with the second pivot section 22 of the second clamping member 20 and the first pivot section 12 of the first clamping member 10.

The present invention further includes a pivot member 40 pivotally connecting the first clamping member 10, second clamping member 20 and outer cover 30 with each other. A torque spring 41 is connected between the first and second clamping members 10, 20. The concave 16 of the clamping arm 11 of the first clamping member 10 is opposite to the thrusting sting 24 of the second clamping member 20.

The present invention further includes a resilient member 50 disposed between the first and second fixing seats 26, 36. By means of the pushing of the resilient member 50, in normal state, the thrusting section 21 abuts against the interconnecting section 33 with the thrusting sting 24 retracted in the outer cover 30 so as to avoid impalement.

Figure 4:
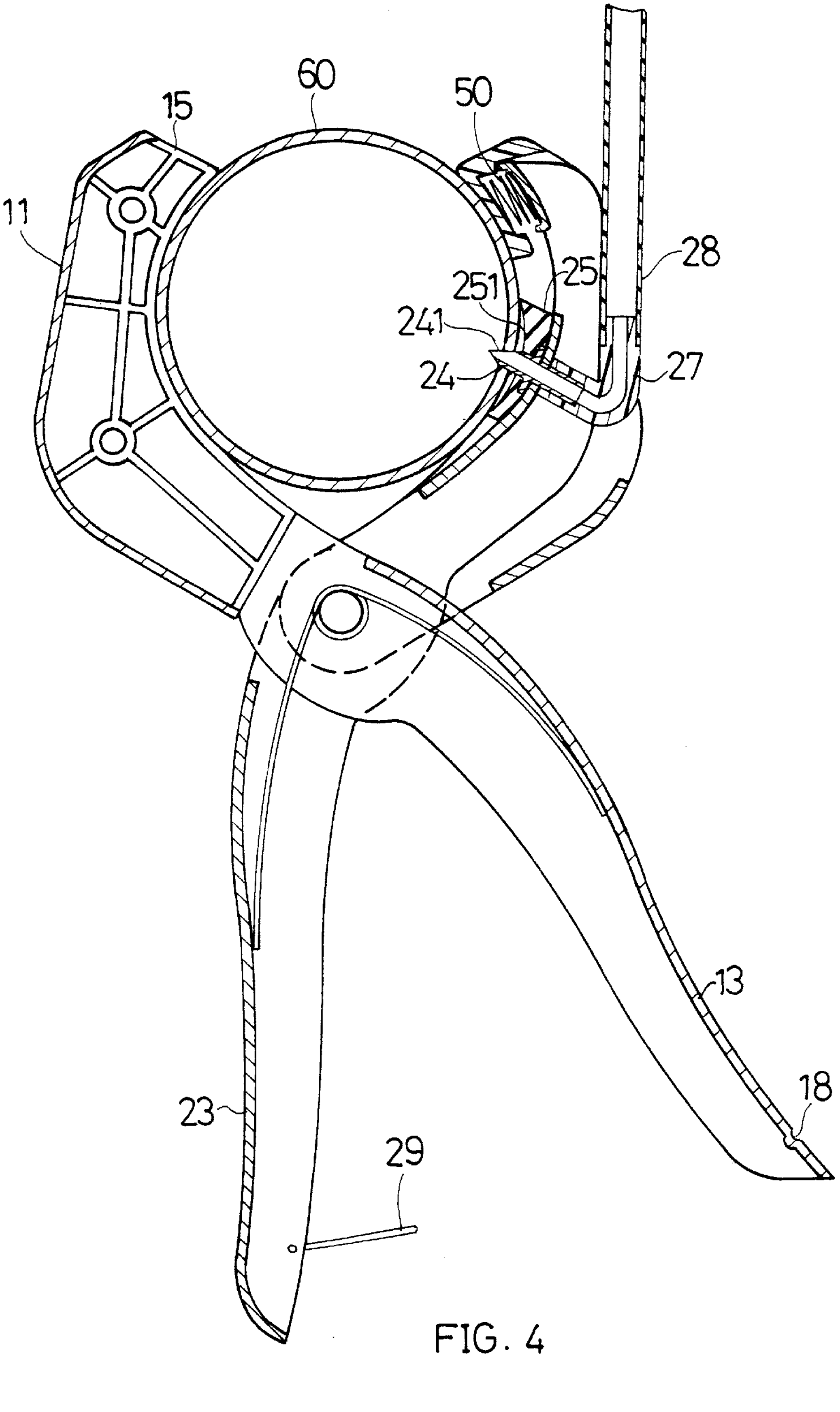
FIG. 4 is a sectional view showing the operation of the present invention.
Figure 5:
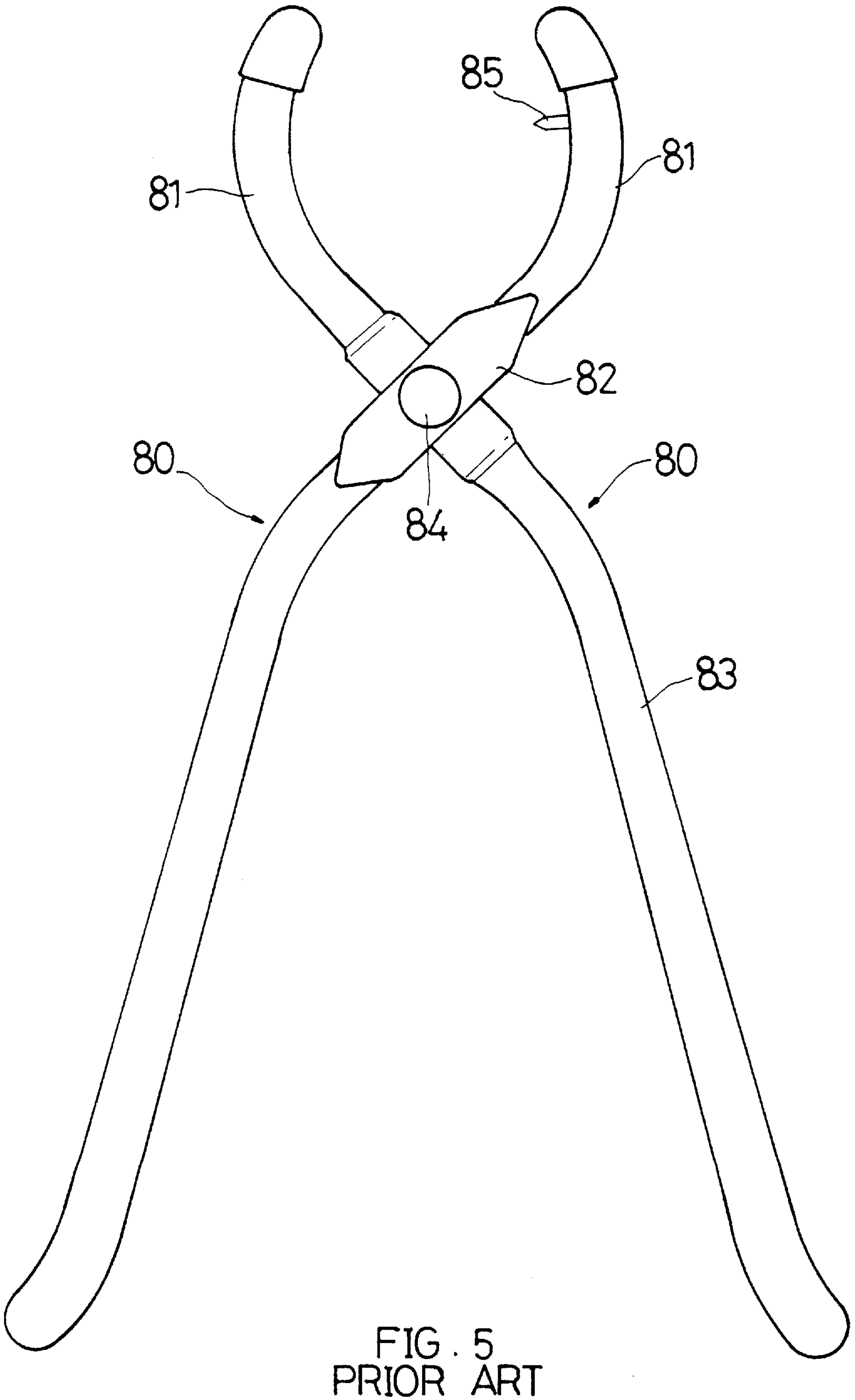
FIG. 5 PRIOR ART
FIG. 5 is a plane view of a conventional can-breaking pincers.

Please refer to FIGS. 2 and 4. In use, a waste high pressure gas can 60 is placed between the concave 16 of the clamping arm 11 and the outer cover 30. Then the grips 13, 23 are held tightly, whereby the grip 23 drives the thrusting section 21 to compress the resilient member 50 and push and turn the outer cover 30 toward the can 60. Also, the grip 13 drives the clamping arm 11 toward the can 60 so as to tightly clamp the can 60. The grips 13, 23 are further held tightly, whereby the grip 23 drives the thrusting section 21 to compress the resilient member 50. However, after the outer cover 30 is tightly pressed against the can 60, the resilient member 50 is further compressed to make the soft pad 25 first stably snugly attach to the can 60. Thereafter, the thrusting sting 24 thrusts the can 60 and the gas remaining in the can 60 is exhausted through the interior space of the thrusting sting 24 and through the gas exhaustion bent tube 27 and the gas exhaustion pipe 28 into the processor (not shown).

It may take place that a part of the gas will leak from the outer wall of the can at the thrusting sting 24. However, the soft pad 25 is fitted around the thrusting sting 24 so that the leaking gas will flow from the depression 251 of the soft pad 25 through the slope opening 241 of the thrusting sting 24 into the gas exhaustion bent tube 27 and then discharge. Therefore, the leakage of the gas is avoided.

Prior to thrusting of the thrusting sting 24 into the can 60, the outer cover 30 and the soft pad 25 serve to stably locate the can 60. Therefore, the thrusting sting 24 is able to stably thrust the can 60 without bending or deformation and thus the using life of the present invention is prolonged. After the gas is exhausted and the grips 13, 23 are released, the resilient member 50 is able to push the outer cover 30 away from the thrusting section 21, whereby the thrusting sting 24 is automatically resiliently extracted out of the can 60 and it will be no more necessary for an operator to manually draw out the can 60.

When stored, the grips 13, 23 are first held tightly and then the latch ring 29 is latched in the notch 18 so as to collect the grips 13, 23 and reduce the volume of the present invention.

It is to be understood that the above description and drawings are only used for illustrating one embodiment of the present invention, not intended to limit the scope thereof. Any variation and derivation from the above description and drawings should be included in the scope of the present invention.

What is claimed is:

1. A can-breaker comprising:

a first clamping member including a clamping arm, a first pivot section and a first grip, the clamping arm being formed with a concave;

a second clamping member including a thrusting section, a second pivot section and a second grip, a middle portion of the thrusting section being disposed with a thrusting sting, one end of the thrusting section distal from the second grip being disposed with a first fixing seat;

an outer cover fitted on outer side of the thrusting section of the second clamping member and composed of two cover boards and an interconnecting section, one end of each cover board near the connecting section being formed with a pivot hole, the other end of each cover board distal from the pivot hole being fixedly disposed with a second fixing seat;

a pivot member passed through the pivot holes of the cover boards, the second pivot section and the first pivot section to pivotally connect the first clamping member, second clamping member and outer cover with each other, a torque spring being connected between the first and second clamping members, the concave of the clamping arm of the first clamping member being opposite to the thrusting sting of the thrusting section of the second clamping member; and a resilient member disposed between the first and second fixing seats.

2. A can-breaker as claimed in claim 1, wherein a soft pad is fitted around the thrusting sting, the soft pad having a height higher than a height of a projecting section of the thrusting sting, the soft pad being formed with a depression.

3. A can-breaker as claimed in claim 1, wherein the thrusting sting is a hollow sting formed with a slope opening, the thrusting sting being communicated with a gas exhaustion pipe.

* * * * *